Figure 1:
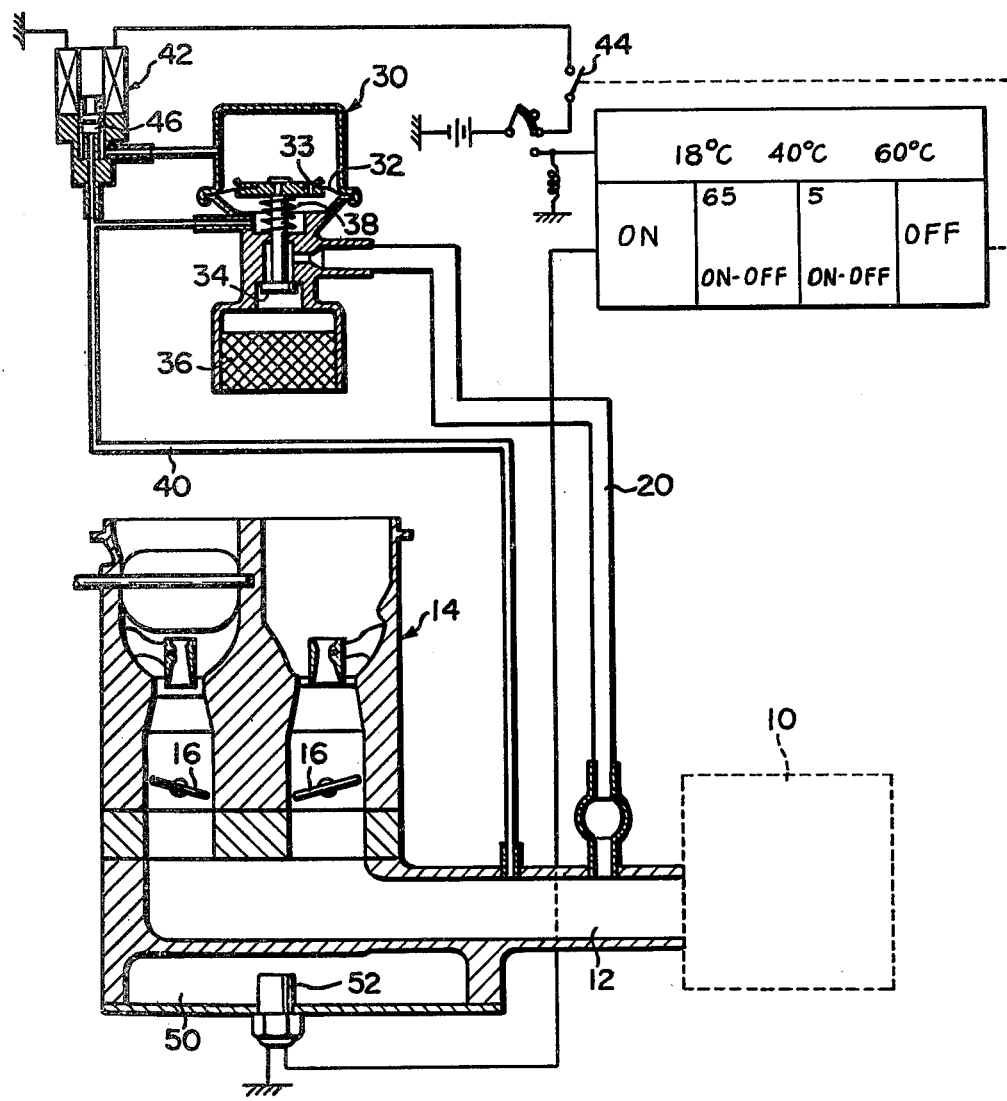

United States Patent [19]

Yamashita et al.

[11] 4,195,602

[45] Apr. 1, 1980

[54] INTAKE CONTROL MEANS FOR INTERNAL COMBUSTION ENGINES

[75] Inventors: Ryuichi Yamashita; Hiromitsu Matsumoto, both of Hamamatsu, Japan

[73] Assignee: Yamaha Hatsudoki Kabushiki Kaisha, Iwata, Japan

[21] Appl. No.: 883,826

[22] Filed: Mar. 6, 1978

[51] Int. Cl.² ............... F02D 31/00; F02M 23/04
[52] U.S. Cl. ................ 123/97 B; 123/119 D; 123/124 R; 123/124 A; 123/124 B
[58] Field of Search ......... 123/119 DB, 119 D, 97 B, 123/124 R, 124 A, 124 B

[56] References Cited

U.S. PATENT DOCUMENTS

| | | | |
|---|---|---|---|
| 3,677,241 | 7/1972 | Gele et al. | 123/97 B |
| 4,098,241 | 7/1978 | Tateno et al. | 123/97 B |

Primary Examiner—Wendell E. Burns
Attorney, Agent, or Firm—Donald D. Mon

[57] ABSTRACT

In an internal combustion engine intended to be run on a leaner-than-stoichiometric mixture, intake control means which when "enabled" permit introduction of supplementary air under deceleration conditions to prevent over-enriching which would otherwise occur when the fuel film on the induction system wall abruptly evaporates. At various temperatures, the feature is disabled completely or for short periods of time so as not to cause over-leaning of the mixture at excessively cold temperatures, or at start up at cold or merely warm conditions.

12 Claims, 1 Drawing Figure

INTAKE CONTROL MEANS FOR INTERNAL COMBUSTION ENGINES

The present invention relates to intake control means for internal combustion engines of the type which is arranged to introduce atmospheric air (secondary air) into an intake passage by utilizing the abrupt pressure decrease in the intake passage which is produced during the engine decelerating operation to prevent the air/fuel mixture from becoming excessively rich at the beginning of said engine decelerating operation.

In internal combustion engines, it has been recognized that there exists a film flow of liquid fuel, or a so-called surface flow, along the wall surface of the intake passage. If an abrupt reduction of pressure occurs in the intake passage as, for example, when the engine throttle valve means is abruptly closed for decelerating operation, the liquid fuel which forms the surface flow is caused to evaporate at once, so that the air/fuel mixture being fed to combustion chamber means is made temporarily excessively rich. This excessively rich mixture is unfavorable since it will cause the increase of noxious unburnt constituents of exhaust gas such as HC and CO.

For the purpose of eliminating such drawbacks, it has been proposed and put into practice to introduce secondary air into the intake passage for diluting the air/fuel mixture when the intake pressure is abruptly lowered and thus preventing the excessively rich mixture. Means provided for the purpose includes suction pressure responsive valve means in secondary air supply conduit means leading to the intake passage, the pressure responsive valve means being adapted to be opened to introduce secondary air when the pressure in the intake passage is abruptly lowered and then automatically to be closed after a certain period of time has elapsed.

In an engine having the type of intake air/fuel mixture control means with such suction pressure responsive valve means, a sufficiently abrupt intake pressure drop to be capable of opening the suction pressure responsive means is also produced when the engine is started after cranking. At the time of engine start, since the aforementioned fuel surface flow does not exist in the intake passage, the air/fuel mixture would be diluted with the secondary air which is introduced through the suction pressure responsive means during the engine start operation. The opening of the suction pressure responsive means thus caused during engine start might be only a small problem to an engine which is supposed to utilize a very rich air/fuel mixture for engine start, such as a conventional engine. However, it is required to make the mixing ratio of the mixture for engine start as lean as possible in order to meet the recent severe regulations of engine pollutant emissions. In an engine having means for this purpose, difficulties are encountered in that an excessively lean mixture is produced when the secondary air is introduced into the intake passage while the engine is started resulting in engine stoppage or rough operation. This problem is especially severe at cold engine start when fuel atomization is very poor.

The present invention is intended to provide the above type of intake air/fuel mixture control with means which can solve the problem of the air/fuel mixture's becoming excessively lean during engine start operation.

FIG. 1 is a cross-section view, partly in schematic notation, showing the presently-preferred embodiment of the invention.

The internal combustion engine 10 has an inlet pipe defining an intake passage 12 which has an outer end in turn connected with a carburetor 14. The carburetor includes throttle valves 16 which control the amount of air/fuel mixture supply by the intake passage 12 into the engine 10 through adjustments of their openings.

To the intake passage 12 is connected a secondary air supply conduit 20 which opens to the atmosphere. At the outer end of the conduit 20 there is provided a suction pressure responsive valve means 30 which is operative to open or close conduit 20. The suction pressure responsive means 30 is provided with a diaphragm 32 connected with a valve member 34 and so arranged that, when the valve member is displaced to the open position, it permits introduction of atmospheric air through an air filter 36 into the secondary air supply conduit 20. The diaphragm 32 is subjected to an upward biasing force by a compression spring 38 disposed at the underside thereof, so that the valve member 34 is normally biased to the closed position. The diaphragm 32 has a small orifice 33 for communicating the upper and the lower chambers defined at opposite sides of the diaphragm.

The lower chamber is constantly communicated with the intake passage 12 downstream of the throttle valve 16 through a conduit 40. The upper chamber is connected with the conduit 40 through a solenoid valve 42. The solenoid valve 42 is operated by means of a thermostatic timer switch 44 in a manner that, when the thermostatic switch 44 is in ON (closed) position, the solenoid valve 42 is energized to displace a valve member 46 in upward direction against the spring force and, thus, connect the chamber above the diaphragm 32 with the conduit 40, so that both chambers are connected with the intake passage. This "disables" suction pressure responsive means 30 and prevents the supply of secondary air. On the other hand, when the thermostatic switch 44 is in OFF (open) position, the solenoid valve 42 is de-energized and the valve member 46 is maintained in the closed position under the biasing force of the spring, so that only the chamber beneath the diaphragm 32 communicates with the intake passage 12 through the conduit 40. This "enables" suction pressure responsive means 30.

The thermostatic timer switch 44 is opened or closed according to the engine temperature. In the illustrated embodiment, the engine temperature is detected by means of a thermistor 52 provided in an intake riser 50 adjacent to the intake passage 12. The thermostatic timer switch 44 is controlled according to predetermined operating conditions by means of the detected signal for engine temperature.

The operating condition for the thermostatic timer switch 44 may be established in such a manner that when the engine temperature is for example below 18° C., the switch 44 is closed ("ON"), and when the engine temperature is in the range of 18° C. to 40° C., the switch is closed for about 65 seconds from the engine start (cut-off point of an engine starter switch) and then opened ("OFF") while when the engine temperature is in the range of 40° C. to 60° C., the switch 44 is closed ("ON") for about 5 seconds from the engine start and then opened ("OFF"), and when the engine temperature is above 60° C., the switch 44 is constantly maintained in OFF position.

The operation of the intake air/fuel mixture control means of the present invention having the constitution as above set forth will be described hereunder taking, for instance, the afore- mentioned operating conditions for the thermostatic timer switch 44.

When the engine temperature is below 18° C., the thermostatic timer switch 44 is closed ("ON") and the valve member 46 of the solenoid valve 42 is displaced to the up-position against the action of the spring 48. Thus, the chamber above the diaphragm 32 is communicated with the conduit 40, so that the suction pressure in the intake passage 12 equally exerts upon both sides of the diaphragm 32. Therefore, the valve member 34 of the suction pressure reponsive valve means 30 is maintained in the closed position ("disabled"), whereby it is possible to avoid any engine troubles, such as failure in engine start and engine misfiring which may otherwise be encountered in cold start due to dilution of (relatively rich) mixture by the introduction of outside air.

When the engine temperature is in the range of 18° C. to 40° C., the thermostatic timer switch remains in ON ("closed") position until the time of 65 seconds has elapsed after the engine starter switch is cut off (engine start) and, thus, the operation in this period is the same as in the above case when the engine temperature is below 18° C. At a time when 65 seconds has elapsed after the engine start or the engine temperature is increased to a value greater than 40° C., the thermostatic timer switch 44 is turned OFF ("open") and the valve member 46 of the solenoid valve 42 is displaced to the closed position (the lowered position), so that only the chamber beneath the diaphragm 32 (the chamber having the spring 38 therein) is directly communicates with the intake passage 12 to allow the intake suction pressure to be introduced thereinto (the suction pressure responsive means 30 is "enabled"). Therefore, the valve member 34 of the suction pressure responsive means 30 can be opened under the influence of the intake suction pressure and, thus, secondary air from the air filter 36 can be introduced through the secondary air supply conduit 20 into the intake passage 12.

The suction pressure in the chamber beneath the diaphragm 32 is transmitted into the upper chamber through the orifice 33 formed in the diaphragm 32. Thus, the pressures in the chambers above and beneath the diaphragm 32 respectively equalize gradually, whereby after a certain time has elapsed the valve member 34 is automatically displaced to the closed position under the influence of the spring 38, even if the suction pressure responsive means 30 is still "enabled" by the thermostatic timer switch 44. In this manner, the control means of the present invention operates to introduce secondary air into the intake passage 12 for a predetermined period after engine deceleration begins.

As is clear from the above description, according to the present invention there can be provided an intake air/fuel control means for internal combustion engines which is so arranged that, during normal engine start operation which is performed at cold engine temperature with poor atomization of fuel, the supply of secondary air is prevented so as to eliminate failures in engine start due to excessively lean air/fuel mixture. Moreover, also when the engine has a little bit warmed up, but atomization of fuel is still poor (between about 18° C. to 40° C.), the supply of secondary air is prevented for a reasonable period in order to prevent rough engine operation due to excessively lean air/fuel mixture.

In engine start operation while the engine temperature is in the range of 40° C. to 60° C., which one usually encounters at re-start operations of an engine, there is a possibility that the aforementioned engine troubles such as rough engine running is caused only at the very beginning of the engine start period due to excessively lean air/fuel mixture by dilution with secondary air supply. In this case, however, since the engine is almost in warmed-up condition, it takes only a short time, for example about 5 seconds, until the fuel in the carburetor and the intake passage 12 is in a readily vaporized condition. Thus, it is possible to maintain steady engine running thereafter without limiting the opening time of the valve member 34 in a specific manner. Therefore, in compliance with the primary purpose of the secondary air supply system, after the brief delay, the suction pressure responsive valve means 30 is opened during engine decelerating operation and maintained in the open position for a predetermined period under the action of the flow restricting orifice 33, so that a reasonable amount of secondary air may be introduced into the intake passage for the aforementioned predetermined time to prevent the air/fuel mixture from becoming excessively rich.

In a case that engine start is performed under an engine temperature above 60° C. after the engine has been warmed-up, the thermostatic timer switch 44 is constantly in the OFF position. Thus, when the pressure in the intake passage 12 is rapidly lowered during the transition from cranking to self running of the engine, the suction pressure responsive valve means 30 is immediately opened and serves to introduce secondary air into the intake passage 12 for a predetermined period. Therefore, even when a liquid fuel deposit is formed on the inner surface of the intake passage during engine operations and then evaporated at once due to the pressure change in the intake passage, it is possible to prevent the intake air/fuel mixture from becoming excessively rich due to such evaporation of liquid fuel.

This invention is not to be limited by the embodiments shown in the drawings and described in the description which are given by way of example and not of limitation, but only in accordance with the scope of the appended claims.

I claim:

1. Intake control means for internal combustion engines comprising: secondary air supply conduit means for connecting with the atmosphere the intake passage means downstream from the throttle valve of an engine carburetor; pressure responsive valve means disposed in said secondary air supply conduit means and adapted to open the secondary air supply conduit means for a predetermined time as the consequence of an abrupt reduction of pressure in said intake passage means; and means for disabling the opening of the pressure responsive valve means at all times when the engine temperature is below a predetermined value, and also at cool and warm temperatures disabling said opening for a brief period of time and thereafter enabling said opening.

2. The intake control means according to claim 1, wherein the pressure responsive valve means comprises an open to flow-closed to flow valve including diaphragm means whose position determines the flow condition; the open-closed operation of the pressure responsive valve means being controlled by pressure in the intake passage means being applied to only one side of the diaphragm means when the engine temperature is above a predetermined value, and the said open-closed operation of the pressure responsive valve means being disabled by applying said pressure in said intake pressure means to both sides of said diaphragm means when the engine temperature is below a predetermined value.

3. The intake control means according to claim 1, wherein said disabling means comprises a solenoid valve means operated by thermostatic ON-OFF switch means whose switching condition is determined by the engine temperature.

4. The intake control means according to claim 2, wherein said disabling means comprises a solenoid valve means operated by thermostatic ON-OFF switch means whose switching condition is determined by the engine temperature.

5. The intake control means according to claim 1 in which said pressure responsive valve means after being opened is caused to close after a predetermined time interval in each event of said abrupt reduction of pressure.

6. The intake control means according to claim 2 in which said pressure responsive valve means after being opened is caused to close after a predetermined time interval in each event of said abrupt reduction of pressure.

7. The intake control means according to claim 3 in which said pressure responsive valve means after being opened is caused to close after a predetermined time interval in each event of said abrupt reduction of pressure.

8. The intake control means according to claim 2 in which a bleed orifice extends through the diaphragm to permit pressure to equalize on both sides of the diaphragm, thereby to close said valve.

9. The intake control means according to claim 6 in which a bleed orifice extends through the diaphragm to permit pressure to equalize on both sides of the diaphragm, thereby to close said valve.

10. The intake control means according to claim 1 in which said brief period of time is of longer duration when the temperature is cooler than when it is warmer.

11. The intake control means according to claim 2 in which said brief period of time is of longer duration when the temperature is cooler than when it is warmer.

12. The intake control means according to claim 3 in which said brief period of time is of longer duration when the temperature is cooler than when it is warmer.

* * * * *